US009992082B2

(12) United States Patent
MacNeil et al.

(10) Patent No.: US 9,992,082 B2
(45) Date of Patent: Jun. 5, 2018

(54) CLASSIFIER BASED GRAPH RENDERING FOR VISUALIZATION OF A TELECOMMUNICATIONS NETWORK TOPOLOGY

(71) Applicant: CENX, Inc., Ottawa (CA)

(72) Inventors: Cameron MacNeil, Ottawa (CA); Eric Soutar, Ottawa (CA)

(73) Assignee: CENX, INC., Ontario (CA)

( * ) Notice: Subject to any disclaimer, the term of this patent is extended or adjusted under 35 U.S.C. 154(b) by 21 days.

(21) Appl. No.: 14/960,054

(22) Filed: Dec. 4, 2015

(65) Prior Publication Data

US 2017/0163502 A1     Jun. 8, 2017

(51) Int. Cl.
*H04L 12/26*     (2006.01)
*H04L 12/24*     (2006.01)

(52) U.S. Cl.
CPC ............ *H04L 43/045* (2013.01); *H04L 41/12* (2013.01); *H04L 41/145* (2013.01)

(58) Field of Classification Search
CPC ... H04L 41/0853; H04L 41/12; H04L 41/145; H04L 41/22; H04L 43/045; H04L 45/02; H04W 16/18; H04W 40/24; H04W 40/248
See application file for complete search history.

(56) References Cited

U.S. PATENT DOCUMENTS 6,054,987 A     4/2000    Richardson
6,112,015 A *   8/2000    Planas ...................... H04L 41/22
                                                                           709/220

(Continued)

FOREIGN PATENT DOCUMENTS

CA          2411423 A1 *   9/2003           H04B 10/07
CN      101729297 A *   6/2010

(Continued)

OTHER PUBLICATIONS

Abello et al., "Large Networks Present Visualization Challenges", Aug. 1999, Newsletter ACM SIGGRAPH Computer Graphics Homepage archive, vol. 33 Issue 3, pp. 13-15 (Year: 1999).*

(Continued)

*Primary Examiner* — Eric Nowlin
(74) *Attorney, Agent, or Firm* — Sterne, Kessler, Goldstein & Fox P.L.L.C.

(57) ABSTRACT

Systems, methods, and computer program embodiments are disclosed for providing graphical visualization of a telecommunications network topology. In an embodiment, raw graph data may be received that that represents one or more communications paths in the telecommunications network. The raw graph data may contain a plurality of network nodes and connections between the nodes, and each node may be associated with an entity type. A graph classification may then be determined based on the received raw graph data, and the classification may be associated with a plurality of graph rendering rules. The raw graph data may be converted to rendered graph data by determining graphical positions for each of the plurality of network nodes according to the plurality of rendering rules. In an embodiment, the rendered graph data may include the plurality of network nodes, the determined position and associated entity type of each node, and connections between nodes.

22 Claims, 7 Drawing Sheets

(56) References Cited

U.S. PATENT DOCUMENTS

| | | | | |
|---|---|---|---|---|
| 6,144,962 A * | 11/2000 | Weinberg | G06F 11/32 | |
| 6,219,053 B1 * | 4/2001 | Tachibana | G06F 3/0481 | 345/440 |
| 6,237,006 B1 * | 5/2001 | Weinberg | G06F 11/32 | 345/419 |
| 6,426,761 B1 * | 7/2002 | Kanevsky | G06F 3/0481 | 715/764 |
| 6,853,388 B2 * | 2/2005 | Ueno | H04L 41/0681 | 709/246 |
| 7,047,496 B2 * | 5/2006 | Nelles | H04B 10/07 | 703/14 |
| 7,327,695 B2 * | 2/2008 | Molnar | H04L 41/0806 | 370/254 |
| 7,342,581 B2 * | 3/2008 | Vinberg | G06F 3/04817 | 345/440 |
| 7,362,974 B2 * | 4/2008 | De Patre | H04J 14/0227 | 370/217 |
| 7,765,319 B1 * | 7/2010 | Gorman | H04L 41/12 | 370/351 |
| 7,801,971 B1 * | 9/2010 | Amidon | H04L 51/32 | 709/200 |
| 8,494,996 B2 * | 7/2013 | McKeown | H04L 41/12 | 706/47 |
| 8,601,113 B2 * | 12/2013 | Dolisy | G06F 17/30489 | 709/202 |
| 8,627,234 B2 * | 1/2014 | Kim | G06F 3/0486 | 715/736 |
| 9,003,292 B2 * | 4/2015 | Smith | H04L 41/12 | 715/733 |
| 9,223,492 B2 * | 12/2015 | Kim | G06F 3/0486 | |
| 9,240,930 B2 * | 1/2016 | Smith | H04L 41/12 | |
| 9,246,772 B2 * | 1/2016 | Smith | H04L 41/12 | |
| 9,331,919 B2 * | 5/2016 | Stephens | H04L 43/062 | |
| 9,781,008 B1 * | 10/2017 | Notari | H04L 41/12 | |
| 9,836,183 B1 * | 12/2017 | Love | G06F 3/04817 | |
| 2002/0024535 A1 * | 2/2002 | Ueno | H04L 41/0681 | 715/736 |
| 2002/0048263 A1 * | 4/2002 | Fieremans | H04L 41/12 | 370/254 |
| 2003/0097438 A1 | 5/2003 | Bearden et al. | | |
| 2003/0180042 A1 * | 9/2003 | Nelles | H04B 10/07 | 398/27 |
| 2004/0215764 A1 * | 10/2004 | Allen | H04L 41/12 | 709/224 |
| 2005/0069314 A1 * | 3/2005 | De Patre | H04J 14/0227 | 398/5 |
| 2005/0135274 A1 * | 6/2005 | Molnar | H04L 41/0806 | 370/255 |
| 2006/0048075 A1 * | 3/2006 | Kim | G06F 3/0482 | 715/840 |
| 2006/0129939 A1 * | 6/2006 | Nelles | H04B 10/07 | 715/736 |
| 2006/0290704 A1 * | 12/2006 | White | G06T 1/60 | 345/522 |
| 2008/0194231 A1 * | 8/2008 | Kim | H04L 63/08 | 455/411 |
| 2009/0285120 A1 * | 11/2009 | Swan | H04L 41/12 | 370/254 |
| 2009/0290513 A1 * | 11/2009 | Swan | H04L 41/0213 | 370/255 |
| 2009/0327903 A1 * | 12/2009 | Smith | H04L 41/12 | 715/737 |
| 2011/0207445 A1 * | 8/2011 | Kim | H04L 63/08 | 455/414.2 |
| 2011/0320394 A1 * | 12/2011 | McKeown | G06F 17/30958 | 706/47 |
| 2013/0159863 A1 * | 6/2013 | Smith | H04L 41/12 | 715/734 |
| 2013/0159864 A1 * | 6/2013 | Smith | H04L 41/12 | 715/734 |
| 2013/0201215 A1 * | 8/2013 | Martellaro | G09G 5/00 | 345/633 |
| 2014/0026059 A1 * | 1/2014 | Kim | G06F 3/0482 | 715/737 |
| 2014/0160979 A1 * | 6/2014 | Durazzo | H04L 41/12 | 370/254 |
| 2014/0189435 A1 * | 7/2014 | Manuel-Devadoss | G06F 11/30 | 714/43 |
| 2014/0250377 A1 * | 9/2014 | Bisca | G06F 17/30011 | 715/705 |
| 2014/0280900 A1 * | 9/2014 | McDowall | H04L 41/12 | 709/224 |
| 2015/0074260 A1 | 3/2015 | Anand et al. | | |
| 2015/0089374 A1 * | 3/2015 | Nagarajan | H04L 41/22 | 715/734 |
| 2015/0127806 A1 * | 5/2015 | Zizlavsky | H04L 41/0853 | 709/224 |
| 2015/0269639 A1 * | 9/2015 | Mistriel | G06Q 30/0282 | 705/319 |
| 2016/0212172 A1 * | 7/2016 | Senanayake | H04L 63/20 | |
| 2016/0249240 A1 * | 8/2016 | Tzolov | H04W 24/08 | |
| 2017/0213127 A1 * | 7/2017 | Duncan | G06N 3/0445 | |
| 2017/0272965 A1 * | 9/2017 | Kumar | H04W 24/08 | |
| 2017/0373946 A1 * | 12/2017 | Lewandowski | H04L 41/22 | |

FOREIGN PATENT DOCUMENTS

| | | | |
|---|---|---|---|
| CN | 106130805 A * | 11/2016 | |
| CN | 106297540 A * | 1/2017 | |
| CN | 106685716 A * | 5/2017 | |
| WO | WO-2015140483 A1 * | 9/2015 | H04L 41/145 |
| WO | WO 2016177046 A1 * | 11/2016 | H04L 41/00 |

OTHER PUBLICATIONS

Koutsofios et al., "Visualizing large telecommunication data sets", Jun. 1999, IEEE Computer Graphics and Applications, vol. 19, Issue 3, pp. 16-19 (Year: 1999).*

Myers et al., "Exploring visualization of complex telecommunications systems network data", Oct. 9, 2002, 2002 IEEE International Conference on Systems, Man and Cybernetics (Year: 2002).*

Dwyer et al., "Dunnart: A Constraint-based Network Diagram Authoring Tool," Clayton School of Information Technology, Monash University, Australia; pp. 1-12, (2009).

Withall et al., "Network Visualization: A Review," IET Communications, 1 (3), 2007; pp. 365-372, (Jun. 2007).

Becker et al., "Visualizing Network Data," IEEE Transactions on Visualization and Computer Graphics, vol. 1, No. 1, Mar. 1995; pp. 16-21, (Mar. 1995).

Loubier et al., "Visualization and Analysis of Large Graphs," 6 pages, (Nov. 2007).

Schultz, et al., "Visualizing Graphs—A Generalized View," Department of Computer Science, University of Rostock, Germany, 8 pages, (Jul. 24, 2006).

Liu, et al., "A Survey on Information Visualization: Recent Advances and Challenges," The Visual Computer 30, No. 12, 2014; pp. 1373-1393, (Dec. 2014).

International Search Report and Written Opinion for International Appl. No. PCT/IB2016/057334, Canadian Intellectual Property Office, dated Mar. 28, 2017, 8 pages.

* cited by examiner

CLASSIFIER BASED GRAPH RENDERING FOR VISUALIZATION OF A TELECOMMUNICATIONS NETWORK TOPOLOGY

BACKGROUND

Field

This disclosure generally relates to telecommunications network management and visualization tools.

Background

Network data usage has increased rapidly in recent years. Network service users demand higher bandwidth with better quality and secure connectivity. Modern network service providers operate local, regional, and nationwide networks to provide connectivity to users. These networks are built with a variety of equipment to perform various tasks, and such equipment may be manufactured by multiple vendors. Each piece of equipment may be complex enough to handle hundreds to thousands of simultaneous connections, and different pieces of equipment may be widely dispersed across a region. Wireless base stations, for example, may be geographically distributed across a city to optimize coverage and efficiency.

To meet user demand, network operators are investing heavily in network infrastructure and new applications to increase network capacity and maintain consistent performance. Today's network infrastructure is evolving faster than ever due to significant innovations in high-speed mobile broadband, cloud-based applications, network functions virtualization (NFV), software-defined networking (SDN), carrier Ethernet, and IP virtual private networks (VPNs). These advances in network technologies are impacting the underlying networks upon all network service providers. Service providers introduce 4G technology, cloud-based infrastructure, NFV, and SDN to better scale and manage their services and infrastructure assets. These dynamics have been fueling a transformation from TDM-based bandwidth services to carrier Ethernet and layer 3 IP services such as IP-VPN and Multiprotocol Label Switching (MPLS) connectivity.

For example, NFV and SDN are two emerging technologies that are expanding the transformation of service provider network services. NFV uses virtualization technologies to design, deploy, and manage network services. NFV decouples the network functions, such as firewall, network address translation (NAT), domain name service (DNS), load balancing, WAN optimization, and intrusion detection, from dedicated hardware appliances so that these network functions can execute in software and processes running within virtual machines. SDN separates control and forwarding functions, centralizes management, and programs network behavior using well-defined interfaces. SDN enables network control to become directly programmable, and the underlying infrastructure can be abstracted from applications and network services. With SDN and NFV, service providers can provide differentiated, revenue-generating service offerings to their end customers while reducing operational costs and simplifying network management.

Another extension is Voice over Long Term Evolution (VoLTE), which allows service providers to offer voice communication services over their high speed 4G LTE infrastructures that was traditionally used for data only, maximizing the value of service providers' investment. VoLTE is moving into mainstream production globally. As service providers are deploying VoLTE, service providers are also leveraging NFV technology to build out their VoLTE infrastructure more efficiently and cost effectively.

These disruptive technologies lead to significant challenges for network service providers because network transformation is complex and labor-intensive. Service providers need to build out network infrastructure leveraging emerging technologies while also operating within their existing infrastructure and maintaining the high quality of service end users expect.

Accommodating new technologies can increase the complexity of network operations. The increased operational complexity may include, for example, lengthy circuit turn-up time, inventory inaccuracy, challenges in accurately resolving faults, or unreliable performance for high value applications such as video and VoLTE. To handler this complexity, today's mobile, wire line, and cloud data center service providers are looking for new ways to design, implement, and manage their network infrastructures.

Conventional operations support systems (OSSs) can no longer simply be tweaked to support end-to-end management of increasingly complex network infrastructures. Conventional OSSs are systems used by service providers to manage their networks (e.g., telephone networks or data networks). Conventional OSSs provide functionality including network inventory, fault management, service provisioning, and network configuration. Conventional OSSs often utilize well-known, existing network management models to manage their network elements in service providers' network infrastructures. Well-known examples of network management models include FCAPS and OAMPT.

FCAPS stands for fault, configuration, accounting, performance, and security, which are categories that define network management tasks. FCAPS is the International Organization for Standardization (ISO) Telecommunications Management Network model and framework for network management. Fault management is related to identifying, correcting, and logging network problems (i.e., faults) to minimize network downtime. Configuration management is related to gathering configurations from network devices and applying configurations to network devices. Configurations may be hardware and programming changes, including the addition, deletion, or modification of network equipment and programs in the communications network. Accounting management focuses on gathering network usage statistics so that individual users, departments, or business units can be properly billed for accounting purposes. Performance management is concerned with managing the overall performance of the network and ensuring that network performance remains at acceptable levels. Security management is related to protecting the network against unauthorized access.

Another well-known network management model is OAMPT. OAMPT stands for operations, administration, maintenance, provisioning, and trouble shooting. OAMPT describes five types of network management tasks: operational management, administration, maintenance, provisioning, and troubleshooting. Operational management is concerned with day-to-day normal network operations. Administration includes support procedures for day-to-day operations. The support procedures can include, for example but not limited to, common passwords, equipment and tools access, and customer service report. Maintenance focuses on configuration and hardware changes in response to system deterioration. These changes include, for example but not limited to, scheduling service provider maintenance, standard network equipment configuration changes, routine equipment checks, hardware changes, and software/firmware upgrades. Provisioning is related to configurations that add, update, and remove network hardware equipment and network services. Troubleshooting involves diagnosis of network failures.

Regardless of the management model used, existing OSSs need to be highly flexible to adapt to differing network architectures of different service providers. Providers are constantly adding new services and infrastructure, and managing inventory, configuration, and performance is becoming increasingly difficult. To address network issues and ensure availability, network operators must be able to monitor elements and resources within the network. Network and service visualization applications can provide a network operator with a view and status of resources and communications paths within a network, but graphical representations of complex network architectures need to be generated efficiently in a clear and organized manner to provide utility to the network operator. Visualization applications must therefore be written to account for varying network architectures, technologies, and network resources.

SUMMARY

Systems, methods, and computer program embodiments are disclosed for providing graphical visualization of a telecommunications network topology. In an embodiment, raw graph data may be received that that represents one or more communications paths in the telecommunications network. The raw graph data may contain a plurality of network nodes and a plurality of connections between the nodes, and each node may be associated with an entity type. A graph classification may then be determined based on the received raw graph data, and the classification may be associated with a plurality of graph rendering rules.

The raw graph data may be converted to rendered graph data by determining graphical positions for each of the plurality of network nodes based on a traversal of the raw graph data according to the plurality of rendering rules. The rendered graph data may describe a visual representation of one or more communications path topologies in the network and may include the plurality of nodes and the plurality of connections of the raw graph data, as well as the determined position and associated entity type of each of the plurality of nodes. In an embodiment, the rendered graph data may also include a size assigned to each of the plurality of nodes.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Example System and Graphical Visualization

In the detailed description that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
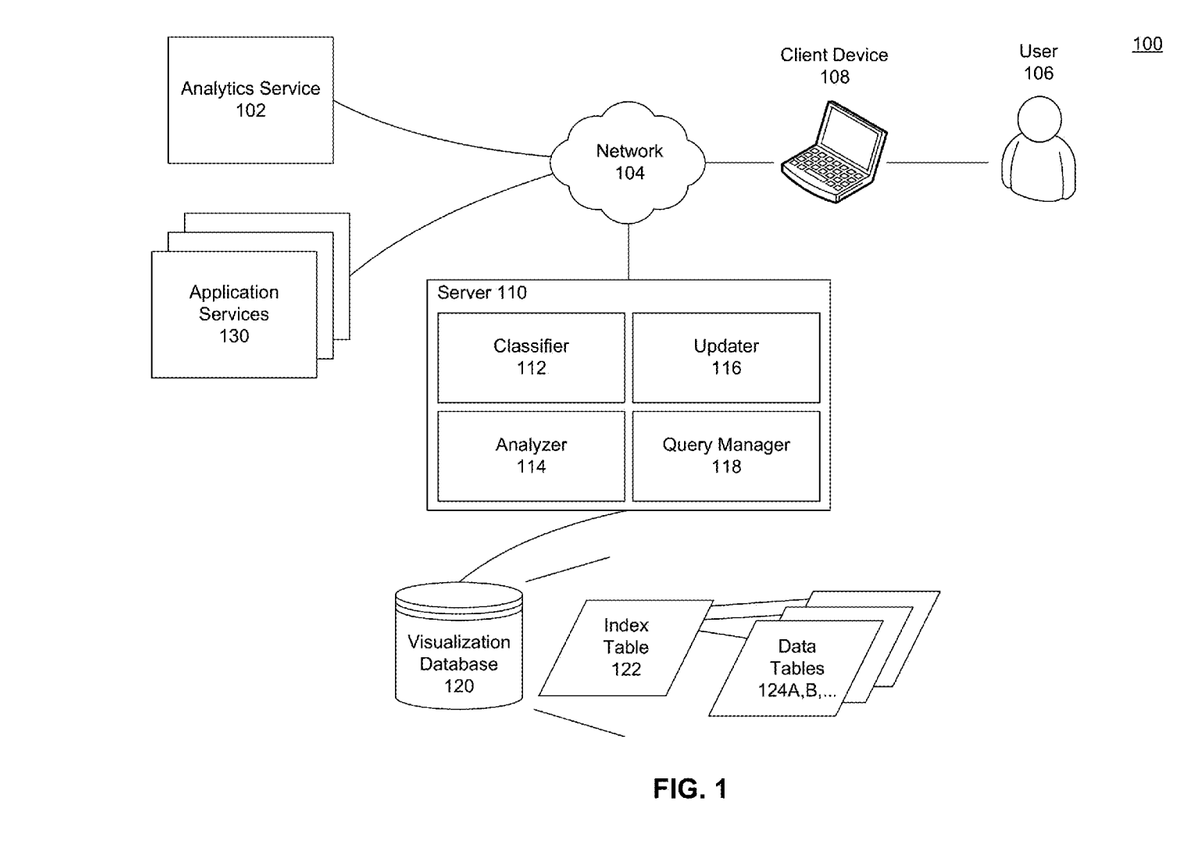
FIG. 1 is a diagram illustrating an example system for providing graphical visualization a telecommunications network, according to an embodiment.

FIG. 1 is a diagram illustrating an example system 100 for providing graphical visualization a telecommunications network, according to an embodiment. To ensure reliability and availability of a telecommunications network, network nodes and resources must be closely monitored, and issues must be quickly diagnosed and corrected. An operations support system (OSS) may provide network and service visualization functionality that enables a network operator to view and analyze graphical representations of communications paths and resources within the network. These may be viewed, for example, in an interactive, graphical user interface presented to the network operator.

Various data structures may be used to hold data representing the topological structure of a network, but these data structures must be flexible enough to represent complex mesh topologies with multiple and redundant connections to and from nodes within the network. For this reason, tree- and list-based structure are often insufficient, and embodiments described employ graph-based data structures to represent differing network topologies. Interactive, visual representations of network topologies may then be created from the graph data for display to a network operator.

In an embodiment, system 100 may include an end user 106, a client device 108, a network 104, an analytics service 102, a plurality of other application services 130, a server 110, and a visualization database 120. Client device 108, analytics service 102, and application services 130 may be coupled to network 104, and network 104 may be any type of computer network capable of communicating data, such as for example, a wired or wireless local area network or a wide area network (e.g., the Internet), or any combination thereof. Client device 108, analytics service 102, and application services 130 may further be coupled to server 110 via network 104.

In an embodiment, server 110 may provide network visualization applications, and a user 106, such as a network operator of a service provider, may interact with server 110 via client device 108 to view and interact with generated visual representations of a telecommunications network topology. Client device 108 may, for example, include a web browser that enables a user to interact with server 110. The web browser may respond to user input by sending a hypertext transfer protocol (HTTP) request to server 110 via network 104. In another example, the user may interface with client device 108 through a native application instead of a web browser, such that the native application communicates with server 110. Client device 108 may be any type of computing device, such as and without limitation, a desktop, laptop, or mobile device.

In an embodiment, analytics service 102 may be configured to receive and process network data from various sources, for example and without limitation, network configuration files, manually created architectural specifications, network analytics processes, and network equipment and performance monitors. This received data may be parsed to construct a plurality of communications path topologies between various network nodes. A list of identified network nodes and connections between the nodes may be generated and stored for use by server 110. In various embodiments, this data, referred to herein as raw graph data, may be stored in a data store coupled to analytics service 102, such as visualization database 120 or another database. The data may also be stored in an electronic file and formatted as an ASCII-based structured data object defined using a standard or custom markup or data definition language, such as but not limited to, XML, JSON, or YANG.

In an embodiment, a network node may refer to any physical or logical network object, such as but not limited to, a router, network interface, network port, or demarcation point. A network node may also represent features, functions, and capabilities that are provided by such network objects. Network nodes that include other network nodes may be referred to as containers. In an embodiment, a container may represent a physical facility, piece of equipment, or logical grouping of equipment used in the network. For example, an example container may be a network cell site, which may include a cell site router. A cell site router may also be considered a container that includes multiple network ports and network interfaces. In this manner, a container is a generalized network node that allows the logical topology of a network to be grounded in physical elements distributed throughout the network. In an embodiment, each network node in the raw graph data is associated with an entity type, which describes the type of network object that the network node represents, for example, a cell site router or network port, as described above.

Application services 130 may represent additional services, applications, and functionality provided by an OSS, for example and without limitation, data audit services, fault monitoring services, or inventory management applications. In various embodiments, analytics service 102, server 110, and application services 130 may be implemented on the same or different servers, and each may be implemented on a single server or distributed across multiple servers.

In an embodiment, raw graph data generated and stored by analytics service 102 may be received by server 110. In various embodiments, raw graph data may periodically be generated and transmitted to server 110 by analytics service 102, periodically requested by server 110 from analytics service 102, or requested by server 110 in response to a receiving a request from a user, such as user 106. Server 110 may then process the received raw graph data to generate rendered graph data used to display a visual representation of all or a portion of the network topology to a user, for example, in a graphical user interface. In this manner, rendered graph data may be refreshed at particular intervals, such as at the end of each day, or may be regenerated on demand.

The rendered graph data may describe a visual graph representation of one or more communications path topologies in the network. In an embodiment, the rendered graph data may include x- and y-coordinate positions within a fixed graphical area. The rendered graph data may also include a size for each node based on the associated entity type. This information may be used to display the visual graph representation to a user, such as user 106, at a client device, such as client device 108.

In order to generate rendered graph data from the received raw graph data, server 110 may include classifier 112, analyzer 114, updater 116, and query manager 118, according to an embodiment. Classifier 112 may receive the raw graph data from analytics service 102. As described above, the raw graph data may include a plurality of nodes and connections between nodes, and each node may be associated with an entity type. Classifier 112 may then determine a graph classification based on the received raw graph data. This classification may be based on the particular topological structure of the telecommunications network and used to determine the layout and positions of network nodes in the rendered graph data.

In an embodiment, the graph classification may be hard-coded within the raw graph data. For example, networks incorporating complex mesh, ring, or star topologies may be given different classifications than networks including only linearly-structured point-to-point connections. In another embodiment, the graph classification may be determined by examining the contents of the raw graph data. For example, a graph classification may be determined by examining the number of connections attached to each network node. Each graph classification may be associated with a plurality of graph rendering rules used to generate the rendered graph data.

Once a graph classification is determined, Analyzer 114 may convert the raw graph data to rendered graph data. In an embodiment, analyzer 114 may traverse the raw graph data according to the plurality of rendering rules to determine graphical positions for each of the plurality of nodes in the raw graph data. In an embodiment, analyzer 114 may traverse all non-container nodes in the raw graph data to determine initial node positions, and adjust positions for each non-container node based on encompassing container nodes. Nodes may also be grouped according to the graph rendering rules prior to determining a position for each node. For example, multiple network ports within a cell site router may be grouped into a single node or the network ports may be rolled into the router node (effectively making the router node a non-container node) in order to reduce complexity of generated visual representations.

In an embodiment, analyzer 114 may first identify a starting node from the plurality of network nodes in the raw graph data. The starting node may be identified by examining various attributes of each according to the rendering rules. For example, a starting node may be identified according to the rendering rules by identifying network nodes with the greatest number of connections, identifying nodes with only one connection, identifying nodes in a top-level container of the graph, or in part or in full by random selection. Intelligent identification of a starting node may simplify position calculations for each node and reduce the number of graph traversals required to set final positions for display.

Analyzer 114 may also assign a size to each of the plurality of network nodes based on the associated entity type. In an embodiment, each entity type may be associated with an icon, shape, or image used to display the network node in a graphical user interface. The size of each icon, shape, or image may be assigned to each associated network node for use in calculating graphical positions. In an embodiment, sizes may be stored according to any logical size measurement, such as but not limited to, pixel resolution, inches, millimeters, or relative percentages.

The plurality of nodes of the raw graph data may then be iterated from the starting node to determine initial node positions within a fixed graphical area. The fixed graphical area may represent a user interface pane in which a visual graph representation may be displayed. In an embodiment, analyzer 114 may first assign a graphical position to the starting node. For example, if the starting node includes a large number of connections, the position may be assigned such that the starting node is in the center of the fixed graphical area. Alternatively, if the starting node includes only one connection, the position may be assigned such that the starting node is near the far left or far right of the fixed graphical area.

Analyzer 114 may then enqueue the starting node to an analysis queue. The analysis queue may facilitate a modified breadth-first-search to iterate through the nodes of the raw graph data. In an embodiment, for each node in the analysis queue, the front node may first be dequeued and marked as visited. Connections to the dequeued node may then be examined, and each node adjacent to the dequeued node that has not yet been visited and does not exist in the analysis queue may be enqueued. Similar to a normal breadth-first-search, this process adds new nodes to the analysis queue that have not yet been discovered or analyzed.

An initial vertical and horizontal position may be assigned by analyzer 114 to each of the adjacent nodes that were enqueued. These positions may be assigned for each adjacent node according to the graph rendering rules and based on the position of the dequeued node, the sizes of the dequeued node and the adjacent node, and a predefined horizontal distance between nodes. In an embodiment, these initial positions may include x- and y-coordinates, and the y-coordinate may initially be identical between the dequeued node and the adjacent node. The x-coordinate may then be calculated as a predefined horizontal distance from the dequeued node. The direction of placement (e.g., left or right) from the dequeued node may be determined according to the graph rendering rules.

In this manner, analyzer 114 first attempts to extend the visual representation of the raw graph data horizontally. This may apply well to linearly-structured point-to-point topologies, and positions may be adjusted and recalculated in subsequent operations to account for more complex network topologies. For example, modern day network architectures often include multiple connections between nodes, creating branching within the graph structure. To prevent overlap and increase usability of the visual representation, the generated rendered graph data must account for branching behavior.

Additionally, branching may create paths of different distances between nodes. To account for this, in an embodiment, analyzer 114 may determine the longest path between an adjacent node and the dequeued node prior to assigning an initial position to the adjacent node. The number of nodes and sizes of the nodes in the determined longest path may then be used to compute the horizontal position of the adjacent node.

In an embodiment, to account for branching, analyzer 114 may adjust the vertical position of each of the adjacent nodes. A branch may be identified based on attributes of the dequeued node. For example, a branch may be determined when the dequeued node has more than two connections, indicating that the node is not simply an intermediate connection between two other nodes. In this case, the adjacent nodes may be adjusted vertically (e.g. up or down) to remove visual overlap of the nodes. In an embodiment, a predefined fixed vertical space may be divided by the number of adjacent branching nodes, and the branching nodes may be vertically evenly distributed within the fixed space.

To account for converging branches, analyzer 114 may adjust the vertical and/or horizontal position of an adjacent node to which two or more separate paths converge. A convergence may be identified based on the attributes of the adjacent node. For example, a convergence may be determined when the adjacent node has connections to more than one visited node. In this case, the position of the adjacent node may be adjusted to lie vertically and/or horizontally between the visited nodes to which the adjacent node is connected. The position may also be adjusted to remove overlapping or crossing connections when possible. Once analysis of the dequeued node has been conducted, the next node in the analysis queue may be dequeued and similarly analyzed.

Other embodiments may assign initial positions to nodes adjacent to the dequeued node both horizontally and vertically from the dequeued node. Adjustments to initial positions may then occur to account for branching in both vertical and horizontal aspects according to the graph rendering rules.

After determining initial positions of the plurality of network nodes, analyzer 114 may define positional constraints between the plurality of nodes according to the graph rendering rules. In an embodiment, positional constraints may include node alignment constraints, node adjacency constraints, and node priority constraints. Constraints may be defined between two nodes, whether or not a direct connection exists between them, based on the attributes of each node.

Node alignment constraints may specify that two nodes should be horizontally or vertically aligned. For example, a constraint may be specified to horizontally align a node of entity type connection point and a node of entity type demarcation point when a connection exists between them. Adjacency constraints may specify that two nodes should be shown next two each other, such that no node exists in the direct line between the two nodes. In an embodiment, adjacency constraints may also include minimum distances between network nodes. Thus, adjacency constraints are intended minimize overlapping nodes and connection crossings resulting from initial positions set by analyzer 114.

Node priority constraints may sort branches of nodes in order to minimize connection crossings while emphasizing the most relevant nodes, connections, and information to a network operator. In various embodiments, node priority constraints may take into account distance from a particular node, such as from the starting node used to determine initial positions or a node managed by a particular service provider, the number of connections of each node (e.g. placing nodes with a large number of connections above those with a small number of connections), and connections between different network segments. For example, a connection between a connection point at a service provider's cell site and a connection point at another cell site may be prioritized such that the two connection points appear horizontally across from each other, and the connection point at the service provider's cell site may be prioritized to appear closer to the left of the fixed graphical area than the other connection point.

Once positional constraints have been defined, analyzer 114 may adjust the initial positions of the plurality of nodes based on the constraints. In an embodiment, analyzer 114 may pass the graph data, including initial positions and positional constraints, to a third party graph layout optimizer. The graph layout optimizer may adjust the network node positions to comply with the defined positional constraints to the extent possible. In this manner, the graph layout optimizer may attempt to minimize node overlap and connection crossing in the visual graph representation, while ensuring most relevant information is clearly presented to an end user. Alternatively, analyzer 114 may apply the positional constraints and perform position adjustments without the use of a third party graph layout optimizer.

Finally, in an embodiment, analyzer 114 may adjust the position of each node such that the positions of network nodes within each container are constrained within a particular rectangular area. The boundaries defined for each container may then be displayed as part of the visual graph representation.

In an embodiment, analyzer 114 may generate rendered graph data including the plurality of nodes and connections of the raw graph data, the associated entity type, size, and graphical position of each node, and the boundaries of each container node. Updater 116 may then write the rendered graph data to visualization database 120. Visualization database 120 may store a plurality of rendered graph data related to one or more communications path topologies in the network. In an embodiment, visualization database 120 may also store different graph classifications and associated graph rendering rules used to generate rendered graph data. As illustrated in FIG. 1, visualization database 120 may store the data in a plurality of different data tables 124A, B, . . . . To improve performance of database queries and updates, application database 230 may also include an index table 122. In an embodiment, query manager 118 may query index table 122 to assist with data insertions and updates, as well as data retrieval. The index table may point to entries in data tables 124, which may include complete individual data records. Or, in an embodiment where the database is de-normalized, the index table may itself include the individual data records in part or in full. In this way, index table 122 may be used to improve performance of database queries and updates.

In an embodiment, query manager 118 may receive a request for visualization of the network topology. For example, a network operator, represented by user 106, may operate client device 108 to access a network visualization application via network 104. Query manager 118 may then retrieve the rendered graph data from visualization database 120.

Query manager 118 may transmit the rendered graph data to client device 108 for presentation to user 106. In an embodiment, the retrieved rendered graph data may be formatted as a structured data object and defined in a custom or standard markup or data definition language, such as but not limited to, XML, JSON, or EDN. The structured data object may be serialized for transmission, minimizing the amount of data transferred between server 110 and client device 108.

Client device 108 may then process the rendered graph data to generate a visual representation of the network topology described by the graph data. In an embodiment, client device 108 may include a specific icon, shape, or image for each network node based on the associated entity type. By performing graphics generation on client device 108, server load may be reduced and transmitted data between server and client may be minimized. In an alternate embodiment, the visual representation described by the rendered graph data may be generated at server 110 and transmitted to client device 108 for display.

In an embodiment, client device 108 may display the generated visual representation in an interactive, graphical user interface. Client device 108 may retrieve additional data from application services 130 to display as part of or alongside the generated visual representation. For example, client device 108 may retrieve detailed information about each node from an inventory management application and display the information when a node is highlighted in the user interface. Client device 108 may also retrieve network fault information from a network fault service coupled to client device 108. Client device 108 may then highlight nodes containing faults in the generated visual representation for easy identification by a network operator. In an embodiment, client device 108 may establish a persistent, bidirectional connection to the fault service and regenerate the visual representation when new fault information is received. In this manner, system 100 provides a user with a visual representation of a network topology that includes information to quickly identify and diagnose network issues.

Figure 2:
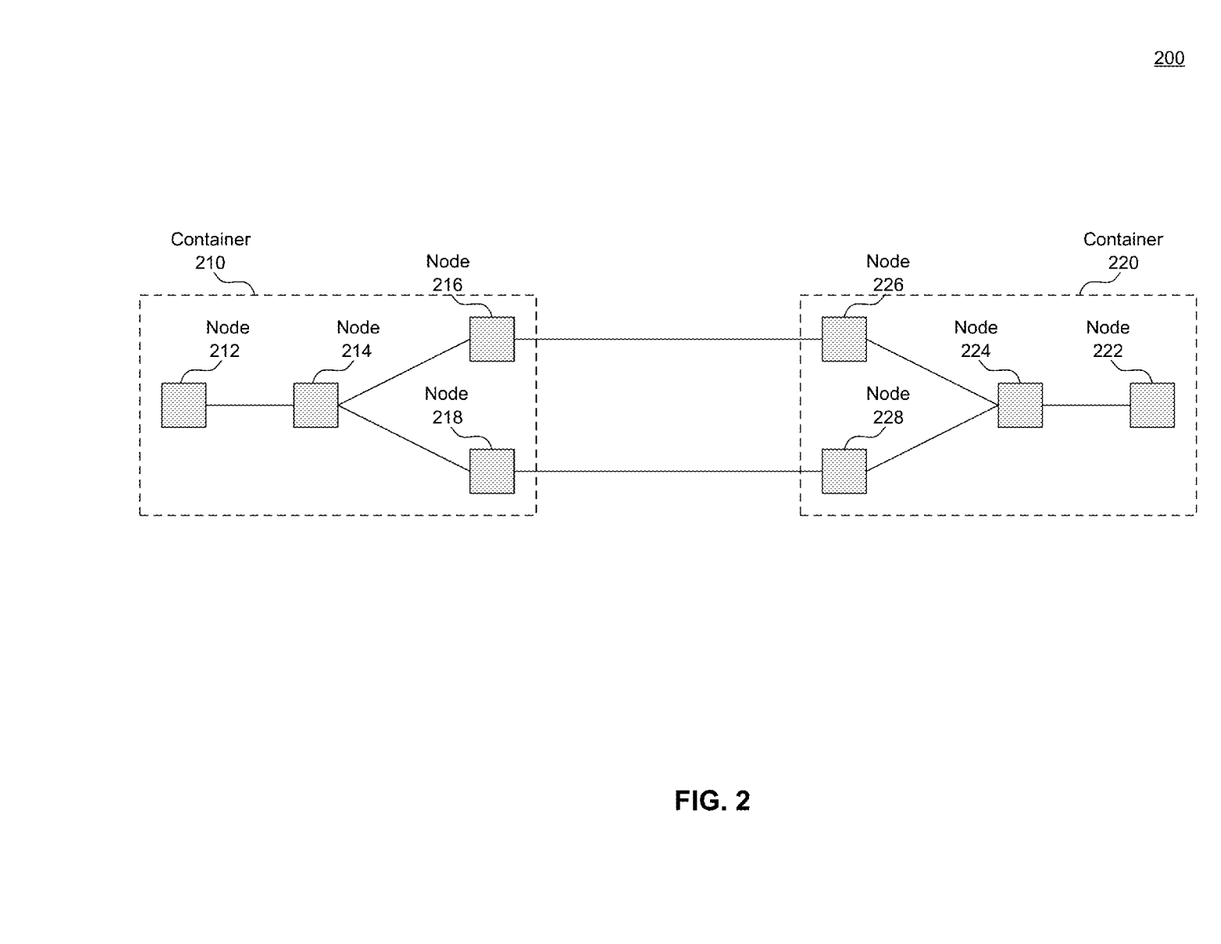
FIG. 2 is a diagram illustrating an example graphical visualization of a telecommunications network topology, according to an embodiment.

By way of example, FIG. 2 is a diagram illustrating an example graphical visualization of a telecommunications network topology, according to an embodiment. Graph 200 may illustrate a visual graph representation described by rendered graph data generated by a network visualization service, such as that provided by server 110 of FIG. 1. To generate graph 200, raw graph data may first be received by a classifier, such as classifier 112 of FIG. 1, that includes network nodes 212-218 and 222-228, container nodes 210 and 220, and connections between the network nodes. A graph classification (e.g., "graph type A") may be determined based on the raw graph data. The raw graph data may then be converted to rendered graph data by an analyzer, such as analyzer 114 of FIG. 1.

In an embodiment, nodes 212-218 and 222-228 may be iterated to determine initial node positions, as described with respect to FIG. 1. In this example, node 212 may first be identified as the starting node for a graph traversal and may be enqueued to an analysis queue. For example, graph rendering rules associated with the determined graph classification may instruct to identify a starting node with only one connection. Node 212 may be assigned an initial position on the left of the fixed graphical area based on the graph classification and associated rendering rules. Node 212 may then be dequeued for analysis and marked as visited. Node 214 may be identified as an adjacent node and enqueued to the analysis queue. Node 214 may be assigned an initial position horizontally adjacent to node 212, where node 214 is placed a predefined horizontal distance from node 212. Because node 212 has only one connection and node 214 is connected to only one visited node, no adjustments to the initial node positions are necessary.

Node 214 may be dequeued next for analysis and marked as visited. Adjacent nodes 216 and 218 may be enqueued and assigned initial positions horizontally adjacent to node 214. In this case, a branch may be detected as node 214 has more than two connections. As a result, the position of node 216 may be adjusted vertically upward, and the position of node 218 may be adjusted vertically downward. This removes the overlap of nodes 216 and 218.

Node 216 may then be dequeued for analysis and marked as visited. Adjacent node 226 may be enqueued and assigned an initial position horizontally adjacent to node 216. Because nodes 216 and 226 both have two connections, no further position adjustments may be made at this time. Node 218 may be dequeued next, and adjacent node 228 may be similarly enqueued and assigned an initial position.

At this point in the example, the analysis queue consists of node 226 and node 228. Node 226 may be dequeued and marked as visited. Adjacent node 224 may be enqueued and assigned an initial position horizontally adjacent to node 226. Because node 226 has two connections and node 224 currently has only one connection to a visited node, no further position adjustments are made.

Node 228 is then dequeued and marked as visited. Adjacent node 224 has already been enqueued, and thus an initial position has already been assigned for node 224. However, node 224 now has connections to more than two visited nodes, indicating a convergence of separate paths. As such, the initial position of node 224 is adjusted to lie vertically between nodes 226 and 228, as shown in FIG. 2.

Node 224 is then dequeued and marked as visited, and an initial position is assigned for node 222. At this point, positional constraints may be defined by the analyzer. For example, an adjacency constraint may be defined between nodes 214 and 216, and alignment constraints may be defined between nodes 212 and 214 and between nodes 216 and 226. Additional similar constraints may also be defined. The analyzer may then adjust the positions of the nodes to conform to the defined positional constraints. In the simple example illustrated in FIG. 2, adjustments based on positional constraints may be minimal.

Finally, the node positions may be adjusted such that nodes 212-218 are constrained within container node 210, and nodes 222-228 are constrained within container node 220. In an embodiment, container nodes 210 and 220 may represent separate network sites or other network elements within the telecommunications network. Boundaries for container nodes 210 and 220 may be defined based on the adjusted positions of network nodes 212-218 and 222-228, and the defined boundaries may be displayed as part of visual graph representation 200.

In an embodiment, the look and feel of visual graph representation 100 may be customized for display to an end user, such as user 106 of FIG. 1. For example, each node 212-218 and 222-228 may be associated with an entity type, and each node may be represented by an icon, shape, or image associated with each entity type. Containers may additionally be displayed using various formatting styles without departing from the general concepts of the embodiments described.

Figure 3:
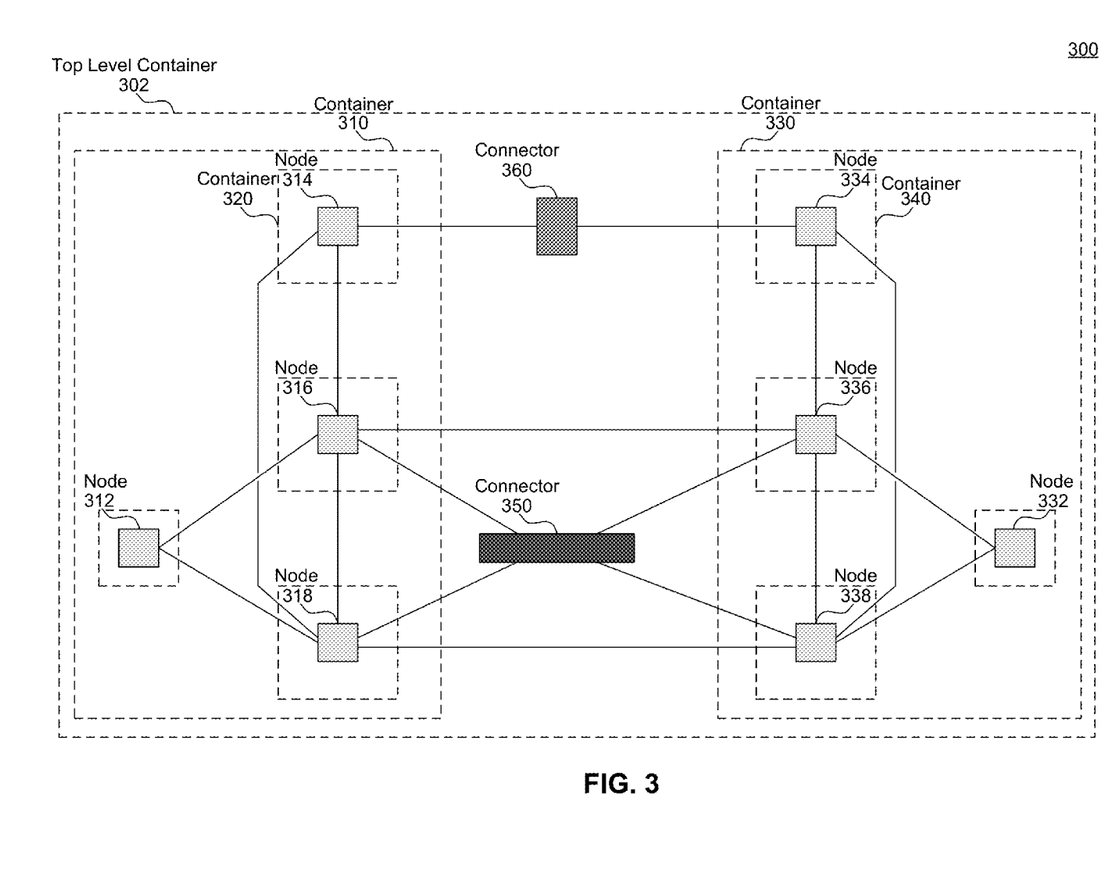
FIG. 3 is a diagram illustrating another example graphical visualization of a telecommunications network topology, according to an embodiment.

FIG. 3 is a diagram illustrating another example graphical visualization of a telecommunications network topology, according to an embodiment. Graph 300 may illustrate a visual graph representation of a more complex mesh network topology as described by generated rendered graph data. To generate graph 300, raw graph data may first be received by a classifier, such as classifier 112 of FIG. 1, that includes network nodes 312-318 and 332-338, container nodes 302, 310, 320, 330, and 340, and connections between the network nodes. In an embodiment, container nodes 320 and 340 represent all illustrated container nodes within container nodes 10 and 330. A graph classification (e.g., "graph type B") may be determined based on the raw graph data. The raw graph data may then be converted to rendered graph data by an analyzer, such as analyzer 114 of FIG. 1. Rendered graph data may be generated in a similar manner to that described with respect to FIG. 2.

In an embodiment, nodes 312-318 and 332-338 may be iterated to determine initial node positions, as described with respect to FIG. 1. In this example, connector node 350 may first be identified as the starting node for a graph traversal and may be enqueued to an analysis queue. For example, graph rendering rules associated with the determined graph classification may instruct to identify a starting node with the greatest number of connections that is part of top level container 302. Node 350 may be assigned an initial position toward the center of the fixed graphical area based on the graph classification and associated rendering rules. Node 350 may then be dequeued for analysis and marked as visited. Adjacent nodes 316, 318, 336, and 338 may be enqueued and assigned initial positions horizontally adjacent to node 350. In this case, graph rendering rules may specify to assign nodes 316 and 318 initial positions to the left of node 350 and nodes 336 and 338 to the right of node 350. In various embodiments, the determination of which nodes to place to the left and right of the dequeued node may be based on attributes of the nodes, or may be arbitrary. Regardless of the initial positions of the adjacent nodes, the final positions may be adjusted based on defined positional constraints to ensure consistency of the generated visual representation.

After analysis of starting node 350 is complete, initial positions for nodes 312, 314, 332, 334, and 360 may similarly be assigned and adjusted as described with respect to FIGS. 1 and 2. At this point, positional constraints may be defined to ensure consistency and clarity of the visual representation. For example, vertical alignment constraints may be specified between nodes 314, 316, and 318, and between nodes 334, 336, and 338. Priority constraints may also be specified that sort nodes such that nodes 314 and 334 are positioned horizontally across from each other, and similar priority constraints may be defined between nodes 316 and 336, and nodes 318 and 338. As described with respect to FIG. 1, positional constraints may be defined according to graph rendering rules associated with the determined graph classification and may vary greatly for different classifications.

Once positional constraints have been defined, positions of nodes 312-318 and 332-338 may be adjusted as illustrated in FIG. 3 by a third party graph layout optimizer or an analyzer, such as analyzer 114 of FIG. 1. The node positions may finally be adjusted such that the nodes may be constrained within boundaries defined by container nodes 302, 310, 320, 330, and 340. In an embodiment, spacing between nodes may be increased to enable visual representation of the boundaries of each container node.

Figure 4:
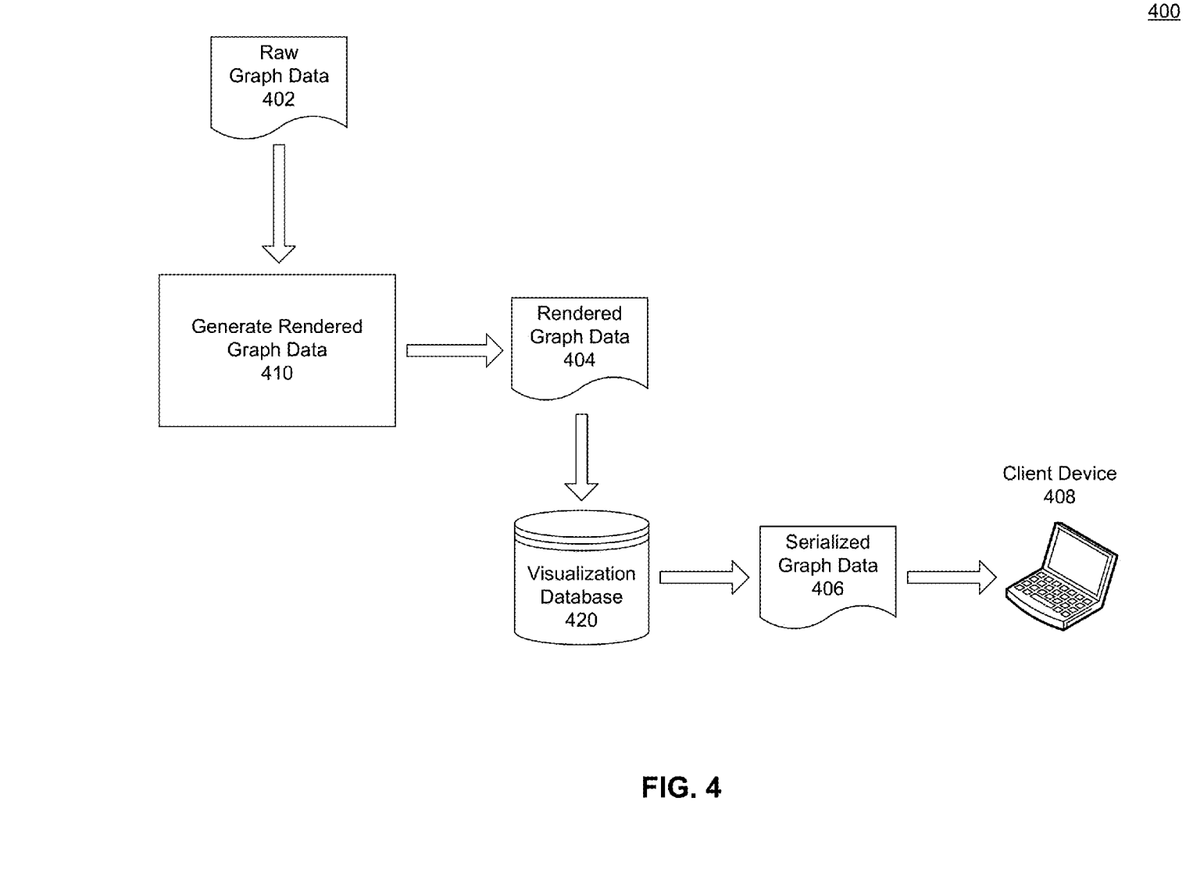
FIG. 4 a diagram illustrating the flow of data when converting raw graph data to a graphical representation of a network topology, according to an embodiment.

FIG. 4 is a diagram illustrating the flow of data when converting raw graph data to a graphical representation of a network topology, according to an embodiment. As described with respect to FIG. 1, raw graph data 402 including a plurality of network nodes and connections between nodes may be received by a network visualization service. At block 410, the rendered graph data 404 may be generated from received raw graph data 402. Rendered graph data 404 may be written to a visualization database 420 that stores a plurality of rendered graph data related to one or more communications path topologies in the network, such as described with respect to visualization database 120 of FIG. 1.

In an embodiment, a request may be received for visualization of the network topology. Rendered graph data may be retrieved from visualization database 420 in response to the received request and may be formatted as a structured data object and defined in a custom or standard markup or data definition language, such as but not limited to, XML, JSON, or EDN. The structured data object may be serialized to generate serialized graph data 406, which may be transmitted to client device 408 for display to a user. In an embodiment, client device 408 may process and generate a visual graph representation of the network topology from serialized data 406, as described with respect to FIG. 1.

Example Method

Figure 5:
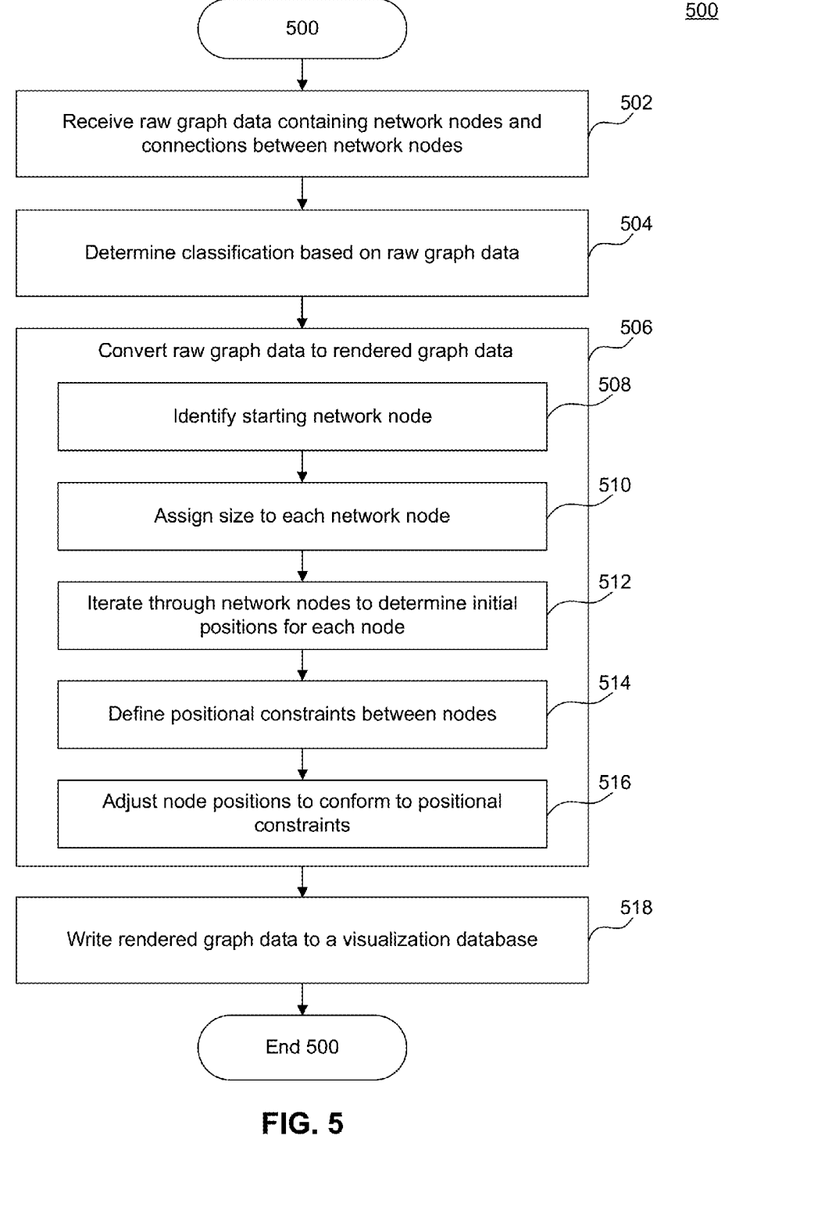
FIG. 5 is an example method for providing graphical visualization of a telecommunications network topology, according to an embodiment.

FIG. 5 is an example method for providing graphical visualization of a telecommunications network topology, according to an embodiment. Method 500 begins at stage 502 where raw graph data containing network nodes and connections between network nodes is received. In an embodiment, each network node may be associated with an entity type. At stage 504, a graph classification may be determined based on the raw graph data. This classification may be based on the particular topological structure of the telecommunications network and used to determine the layout and positions of network nodes in the rendered graph data.

In an embodiment, the graph classification may be hardcoded within the raw graph data. For example, networks incorporating complex mesh, ring, or star topologies may be given different classifications than networks including only linearly-structured point-to-point connections. In another embodiment, the graph classification may be determined by examining the contents of the raw graph data. For example, a graph classification may be determined by examining the number of connections attached to each network node. Each graph classification may be associated with a plurality of graph rendering rules used to generate the rendered graph data.

At stage 506, the raw graph data may be converted to rendered graph data that may be used to display a graphical representation of a portion of the network topology. To accomplish the conversion of raw graph data to rendered graph data, stage 506 includes sub-stages 508-516.

At stage 508, a starting network node of the raw graph data may be identified. The starting node may be identified by examining various attributes of each according to the rendering rules. For example, a starting node may be identified according to the rendering rules by identifying network nodes with the greatest number of connections, identifying nodes with only one connection, identifying nodes in a top-level container of the graph, or in part or in full by random selection.

At stage 510, a size may be assigned to each network node based on the associated entity type. In an embodiment, each entity type may be associated with an icon, shape, or image used to display the network node in a graphical user interface. The size of each icon, shape, or image may be assigned to each associated network node for use in calculating graphical positions. In an embodiment, sizes may be stored according to any logical size measurement, such as but not limited to, pixel resolution, inches, millimeters, or relative percentages.

At stage 512, the network nodes of the raw graph data may be iterated through to determine initial graphical positions for each node within a fixed graphical area. The fixed graphical area may represent a user interface pane in which a visual graph representation may be displayed.

At stage 514, positional constraints between nodes may be defined according to the plurality of graph rendering rules. In an embodiment, positional constraints may include node alignment constraints, node adjacency constraints, and node priority constraints, as described above with respect to FIG. 1. Constraints may be defined between two nodes, whether or not a direct connection exists between them, based on the attributes of each node.

At stage 516, the determined initial node positions may be adjusted to conform to the defined positional constraints. In an embodiment, the graph data, including initial positions and positional constraints, may be passed to a third party graph layout optimizer. The graph layout optimizer may adjust the network node positions to comply with the defined positional constraints to the extent possible. In this manner, the graph layout optimizer may attempt to minimize node overlap and connection crossing in the visual graph representation, while ensuring most relevant information is clearly presented to an end user. Alternatively, the positional constraints may be applied by an analyzer, such as analyzer 114 of FIG. 1, which may perform position adjustments without the use of a third party graph layout optimizer.

Finally, at stage 518, the rendered graph data may be written to a visualization database that may store a plurality of rendered graph data related to one or more communications path topologies in the network. In an embodiment, the rendered graph data may include the plurality of nodes and connections of the raw graph data, and the associated entity type, size, and graphical position of each node. The rendered graph data may also include boundaries of each container node of the raw graph data, as described with respect to FIG. 1.

Figure 6:
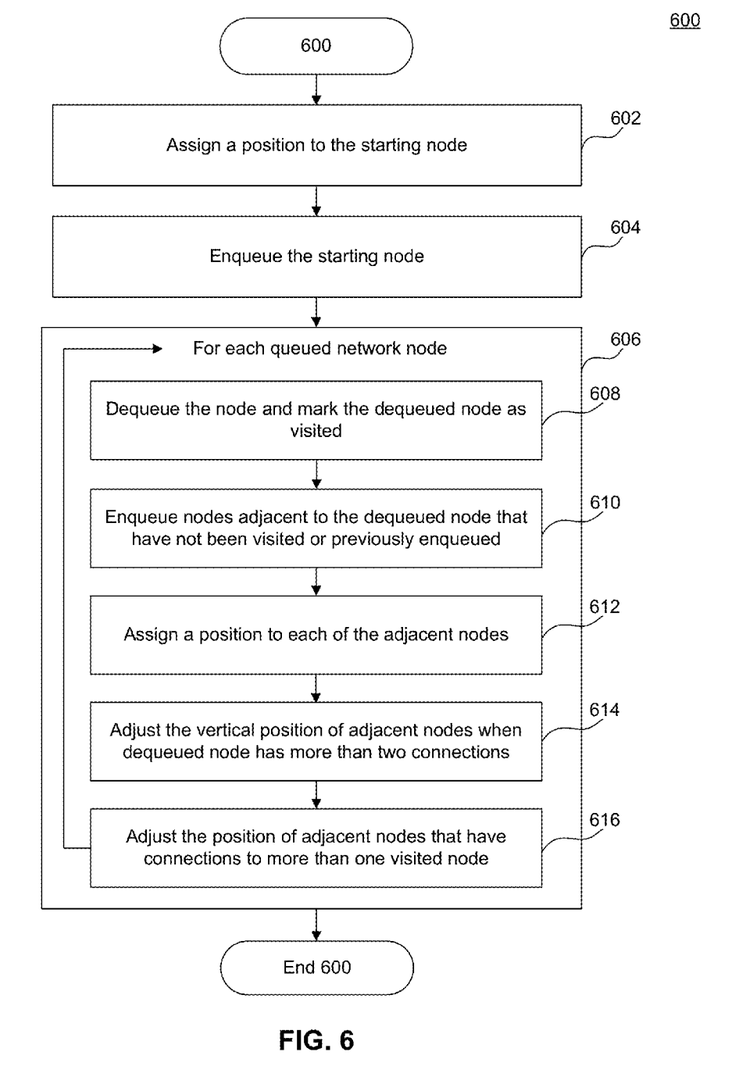
FIG. 6 is an example method for determining graphical positions for a plurality of network nodes, according to an embodiment.

FIG. 6 is an example method for determining graphical positions for a plurality of network nodes, according to an embodiment. Method 600 begins at stage 602 where a position is assigned to an identified starting node. The starting node may be identified as described above with respect to FIG. 5.

At stage 604, the starting node is enqueued to an analysis queue. The analysis queue may facilitate a modified breadth-first-search to iterate through the nodes of the raw graph data. Iterative stage 606 may then operate on each node in the analysis queue and includes stages 608-616. At stage 608, the node at the front of the analysis queue is dequeued and marked as visited.

At stage 610, nodes adjacent to the dequeued node that have not been visited (or previously enqueued) are enqueued to the analysis queue. At stage 612, an initial vertical and horizontal position is assigned to each of the adjacent nodes that have been enqueued at stage 610. These positions may be assigned for each adjacent node according to the graph rendering rules and based on the position of the dequeued node, the sizes of the dequeued node and the adjacent node, and a predefined horizontal distance between nodes. In an embodiment, these initial positions may include x- and y-coordinates, and the y-coordinate may initially be identical between the dequeued node and the adjacent node. The x-coordinate may then be calculated as a predefined horizontal distance from the dequeued node. The direction of placement (e.g., left or right) from the dequeued node may be determined according to the graph rendering rules.

At stage 614, the vertical positions of adjacent nodes are adjusted when the dequeued node has more than two connections to account for branching within the network topology. A branch may be identified based on attributes of the dequeued node. For example, a branch may be determined when the dequeued node has more than two connections, indicating that the node is not simply an intermediate connection between two other nodes. In this case, the adjacent nodes may be adjusted vertically (e.g. up or down) to remove visual overlap of the nodes. In an embodiment, a predefined fixed vertical space may be divided by the number of adjacent branching nodes, and the branching nodes may be vertically evenly distributed within the fixed space.

Finally, at stage 616, the vertical and/or horizontal position of adjacent nodes that have connections to more than one visited node are adjusted to account for converging branches. In an embodiment, the position of each adjacent node may be adjusted to lie vertically and/or horizontally between the visited nodes to which the adjacent node is connected. The position may also be adjusted to remove overlapping or crossing connections when possible.

Example Computer System

Figure 7:
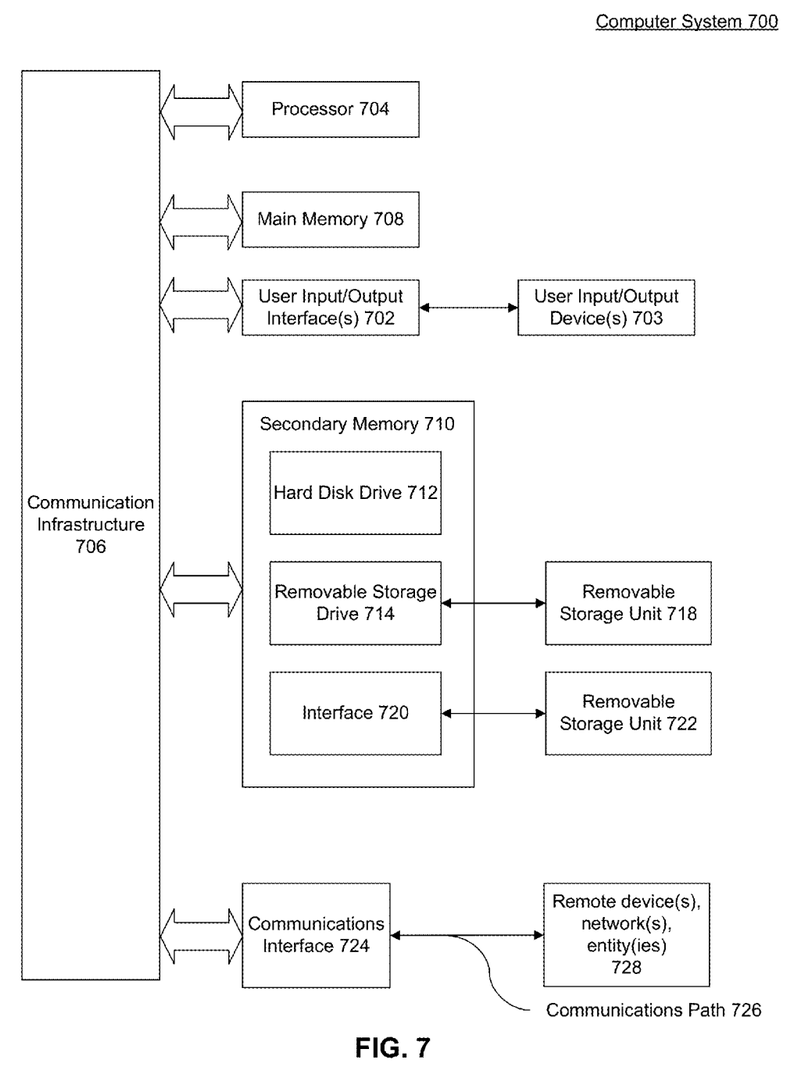
FIG. 7 is a diagram illustrating an example computing device, according to an embodiment.

FIG. 7 is a diagram illustrating an example computing system useful for implementing various embodiments. Various embodiments can be implemented, for example, using one or more well-known computer systems, such as computer system 700. Computer system 700 can be any well-known computer capable of performing the functions described herein, such as computers available from International Business Machines, Apple, Sun, HP, Dell, Sony, Toshiba, etc.

Computer system 700 includes one or more processors (also called central processing units, or CPUs), such as a processor 704. Processor 704 may be connected to a communication infrastructure or bus 706.

One or more processors 704 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 700 also includes user input/output device(s) 703, such as monitors, keyboards, pointing devices, etc., which communicate with communication infrastructure 706 through user input/output interface(s) 702.

Computer system 700 also includes a main or primary memory 708, such as random access memory (RAM). Main memory 708 may include one or more levels of cache. Main memory 708 has stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to an exemplary embodiment, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

In an embodiment, a tangible apparatus or article of manufacture comprising a tangible computer useable or readable medium having control logic (software) stored thereon is also referred to herein as a computer program product, program storage device, or computer-readable storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use the inventions using data processing devices, computer systems and/or computer architectures other than that shown in FIG. 7. In particular, embodiments may operate with software, hardware, and/or operating system implementations other than those described herein.

CONCLUSION

Identifiers, such as "(a)," "(b)," "(i)," "(ii)," etc., are sometimes used for different elements or steps. These identifiers are used for clarity and do not necessarily designate an order for the elements or steps.

Embodiments of the present inventions have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of specific embodiments will so fully reveal the general nature of the inventions that others can, by applying knowledge within the skill of the art, readily modify and/or adapt for various applications such specific embodiments, without undue experimentation, without departing from the general concept of the present inventions. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present inventions should not be limited by any of the above-described embodiments, but should be defined only in accordance with the following claims and their equivalents.

What is claimed is:

1. A system for providing graphical visualization of a telecommunications network topology, comprising:
a memory; and
at least one processor coupled to the memory, the at least one processor configured to:
receive raw graph data that represents one or more communications paths in the telecommunications network, the raw graph data containing data corresponding to a plurality of network nodes and a plurality of connections between the plurality of network nodes, wherein each network node is associated with an entity type; and
determine a graph classification of a plurality of graph classifications based on the received raw graph data, wherein the graph classification is associated with a plurality of graph rendering rules;
identify a starting node from the plurality of network nodes based on the plurality of graph rendering rules;
assign a size to each of the plurality of network nodes based on the entity type associated with each respective network node;
traverse the plurality of network nodes from the starting node based on the plurality of graph rendering rules to convert the raw graph data to rendered graph data, the traversal comprising:
enqueuing the starting node to an analysis queue; and
for each queued network node:
dequeuing the network node for analysis;
marking the dequeued node as visited;
enqueuing each of the plurality of network nodes adjacent to the dequeued node that has not been visited or previously enqueued;
assigning a vertical position and a horizontal position to each of the adjacent nodes based on the position of the dequeued node, the size of the adjacent node, and a predefined horizontal distance between nodes;
adjusting the vertical position of each of the adjacent nodes when the dequeued node has more than two connections; and
adjusting the vertical position and the horizontal position of a node adjacent to the dequeued node when the adjacent node has connections to more than one visited node;
write the rendered graph data to a visualization database, the rendered graph data including data corresponding to the plurality of network nodes, the plurality of connections, and the assigned size, the adjusted vertical position, the adjusted horizontal position, and associated entity type of each of the plurality of network nodes.

2. The system of claim 1, wherein the at least one processor is further configured to:
define positional constraints between the plurality of network nodes according to the plurality of graph rendering rules; and
adjust the position of each of the plurality of network nodes to conform to the defined positional constraints, wherein the rendered graph data includes the adjusted position of each of the plurality of network nodes.

3. The system of claim 1, wherein the at least one processor is further configured to identify the starting node by identifying nodes with a greatest number of connections.

4. The system of claim 1, wherein the at least one processor is further configured to identify the starting node by identifying nodes with one connection.

5. The system of claim 2, wherein the positional constraints include node priority, node adjacency, and node alignment constraints.

6. The system of claim 1, wherein the at least one processor is further configured to assign the vertical position and the horizontal position to an adjacent node by:
determining a longest path between the adjacent node and the dequeued node; and
computing the horizontal position of the adjacent node based on the vertical position and the horizontal position of the dequeued node, the size of the adjacent node, the predefined horizontal distance between nodes, and the number of nodes and the sizes of the nodes in the longest path between the adjacent node and the dequeued node.

7. The system of claim 1, wherein the raw graph data includes data corresponding to one or more containers, each container including one or more of the plurality of network nodes, wherein the at least one processor is further configured to adjust the position of each node such that the positions of network nodes included in a container are constrained within a rectangular area defined by the container.

8. The system of claim 1, wherein the at least one processor is further configured to:
receive a request for visualization of the telecommunications network topology;
retrieve the rendered graph data from the visualization database;
transmit the rendered graph data to a client device for presentation to a user.

9. The system of claim 8, wherein the rendered graph data is transmitted as a serialized data object.

10. A method for providing graphical visualization of a telecommunications network topology, comprising:
receiving raw graph data that represents one or more communications paths in the telecommunications network, the raw graph data containing a plurality of network nodes and a plurality of connections between the plurality of network nodes, wherein each network node is associated with an entity type;
determining a graph classification of a plurality of graph classifications based on the received raw graph data, wherein the graph classification is associated with a plurality of graph rendering rules;
identifying a starting node from the plurality of network nodes;
assigning a size to each of the plurality of network nodes based on the entity type associated with each respective network node;
traversing the plurality of network nodes from the starting node based on the plurality of graph rendering rules to convert the raw graph data to rendered graph data, the traversal comprising:

enqueuing the starting node to an analysis queue; and
for each queued network node:
  dequeuing the network node for analysis;
  marking the dequeued node as visited;
  enqueuing each of the plurality of network nodes adjacent to the dequeued node that has not been visited or previously enqueued;
  assigning a vertical position and a horizontal position to each of the adjacent nodes based on the position of the dequeued node, the size of the adjacent node, and a predefined horizontal distance between nodes;
  adjusting the vertical position of each of the adjacent nodes when the dequeued node has more than two connections; and
  adjusting the vertical position and the horizontal position of a node adjacent to the dequeued node when the adjacent node has connections to more than one visited node; and
writing the rendered graph data to a visualization database, the rendered graph data including data corresponding to the plurality of network nodes, the plurality of connections, and the assigned size, the adjusted vertical position, the adjusted horizontal position, and associated entity type of each of the plurality of network nodes.

11. The method of claim 10, wherein the traversing further comprises:
defining positional constraints between the plurality of network nodes according to the plurality of graph rendering rules; and
adjusting the position of each of the plurality of network nodes to conform to the defined positional constraints, wherein the rendered graph data includes the adjusted position of each of the plurality of network nodes.

12. The method of claim 11, wherein identifying the starting node further comprises identifying nodes with a greatest number of connections.

13. The method of claim 11, wherein identifying the starting node further comprises identifying nodes with one connection.

14. The method of claim 11, wherein the positional constraints include node priority, node adjacency, and node alignment constraints.

15. The method of claim 10, wherein assigning the vertical position and the horizontal position to an adjacent node further comprises:
determining a longest path between the adjacent node and the dequeued node; and
computing the horizontal position of the adjacent node based on the vertical position and the horizontal position of the dequeued node, the size of the adjacent node, the predefined horizontal distance between nodes, and the number of nodes and the sizes of the nodes in the longest path between the adjacent node and the dequeued node.

16. The method of claim 10, wherein the raw graph data includes data corresponding to one or more containers, each container including one or more of the plurality of network nodes, and wherein the position of each network node is adjusted such that the positions of network nodes included in a container are constrained within a rectangular area defined by the container.

17. The method of claim 10, further comprising:
receiving a request for visualization of the telecommunications network topology;
retrieving the rendered graph data from the visualization database;
transmitting the rendered graph data to a client device for presentation to a user.

18. The method of claim 17, wherein the rendered graph data is transmitted as a serialized data object.

19. A non-transitory computer-readable storage device having instructions stored thereon that, when executed by at least one computing device, causes the at least one computing device to perform operations comprising:
receiving raw graph data that represents one or more communications paths in a telecommunications network, the raw graph data containing a plurality of network nodes and a plurality of connections between the plurality of network nodes, wherein each network node is associated with an entity type;
determining a graph classification of a plurality of graph classifications based on the received raw graph data, wherein the graph classification is associated with a plurality of graph rendering rules;
identifying a starting node from the plurality of network nodes;
assigning a size to each of the plurality of network nodes based on the entity type associated with each respective network node;
traversing the plurality of network nodes from the starting node based on the plurality of graph rendering rules to convert the raw graph data to rendered graph data, the traversal comprising:
  enqueuing the starting node to an analysis queue; and
  for each queued network node:
    dequeuing the network node for analysis;
    marking the dequeued node as visited;
    enqueuing each of the plurality of network nodes adjacent to the dequeued node that has not been visited or previously enqueued;
    assigning a vertical position and a horizontal position to each of the adjacent nodes based on the position of the dequeued node, the size of the adjacent node, and a predefined horizontal distance between nodes;
    adjusting the vertical position of each of the adjacent nodes when the dequeued node has more than two connections; and
    adjusting the vertical position and the horizontal position of a node adjacent to the dequeued node when the adjacent node has connections to more than one visited node; and
writing the rendered graph data to a visualization database, the rendered graph data including data corresponding to the plurality of network nodes, the plurality of connections, and the assigned size, the adjusted vertical position, the adjusted horizontal position, and associated entity type of each of the plurality of network nodes.

20. The non-transitory computer-readable storage device of claim 19, wherein to traverse the plurality of network nodes the operations further comprise:
defining positional constraints between the plurality of network nodes according to the plurality of graph rendering rules; and
adjusting the position of each of the plurality of network nodes to conform to the defined positional constraints, wherein the rendered graph data includes the adjusted position of each of the plurality of network nodes.

21. The non-transitory computer-readable storage device of claim 19, wherein to assign the vertical position and the horizontal position to an adjacent node the operations further comprise:
 determining a longest path between the adjacent node and the dequeued node; and
 computing the horizontal position of the adjacent node based on the vertical position and the horizontal position of the dequeued node, the size of the adjacent node, the predefined horizontal distance between nodes, and the number of nodes and the sizes of nodes in the longest path.

22. The non-transitory computer-readable storage device of claim 17, wherein the raw graph data includes data corresponding to one or more containers, each container including one or more of the plurality of network nodes, and wherein the position of each network node is adjusted such that the positions of network nodes included in the container are constrained within a rectangular area defined by the container.

* * * * *

UNITED STATES PATENT AND TRADEMARK OFFICE
CERTIFICATE OF CORRECTION

PATENT NO. : 9,992,082 B2  
APPLICATION NO. : 14/960054  
DATED : June 5, 2018  
INVENTOR(S) : MacNeil et al.

Page 1 of 1

It is certified that error appears in the above-identified patent and that said Letters Patent is hereby corrected as shown below:

On the Title Page

In item (57) Abstract, replace "received that that represents" with --received that represents--.

Signed and Sealed this
Twenty-seventh Day of November, 2018

Andrei Iancu
*Director of the United States Patent and Trademark Office*